US009282503B2

(12) United States Patent
Saini et al.

(10) Patent No.: US 9,282,503 B2
(45) Date of Patent: Mar. 8, 2016

(54) APPARATUS AND METHOD FOR HANDLING BROADCAST SYSTEM INFORMATION IN TELECOMMUNICATIONS SYSTEM USER EQUIPMENT

(75) Inventors: Sukhdev Saini, Wednesbury (GB); Gideon Roberts, Stone (GB); Andrew Farnsworth, Marlbrook (GB)

(73) Assignee: BlackBerry Limited, Waterloo, Ontario (CA)

( * ) Notice: Subject to any disclaimer, the term of this patent is extended or adjusted under 35 U.S.C. 154(b) by 1531 days.

(21) Appl. No.: 11/741,149

(22) Filed: Apr. 27, 2007

(65) Prior Publication Data

US 2008/0267309 A1 Oct. 30, 2008

(51) Int. Cl.
  *G01R 31/08* (2006.01)
  *H04W 48/10* (2009.01)
  *H04W 76/04* (2009.01)

(52) U.S. Cl.
  CPC .............. *H04W 48/10* (2013.01); *H04W 76/04* (2013.01)

(58) Field of Classification Search
  None
  See application file for complete search history.

(56) References Cited

U.S. PATENT DOCUMENTS

| 7,082,108 | B2 * | 7/2006 | Hwang et al. ................. 370/311 |
| 7,298,713 | B2 * | 11/2007 | Goldberg et al. ............. 370/312 |
| 7,437,178 | B2 * | 10/2008 | Jeong et al. ................... 455/525 |
| 2002/0065091 | A1 * | 5/2002 | Choi ............................. 455/509 |
| 2004/0166891 | A1 * | 8/2004 | Mahkonen et al. ........ 455/550.1 |
| 2004/0203451 | A1 * | 10/2004 | Braun et al. ................ 455/67.11 |
| 2005/0164683 | A1 * | 7/2005 | Roberts et al. .............. 455/412.2 |
| 2006/0056316 | A1 | 3/2006 | Chandra et al. |
| 2007/0260851 | A1 * | 11/2007 | Taha et al. ...................... 712/204 |
| 2008/0130795 | A1 * | 6/2008 | Chang et al. ................... 375/329 |
| 2009/0245211 | A1 * | 10/2009 | Kim et al. ...................... 370/336 |

OTHER PUBLICATIONS

Vialen, Jukka, Toskala, Antti, "Radio Interface Protocols," WCDMA for UMTS (Third Edition), John Wiley & Sons, 2004, ISBN: 0-470-87096-6.

(Continued)

*Primary Examiner* — Minh-Trang Nguyen
(74) *Attorney, Agent, or Firm* — Fish & Richardson P.C.

(57) ABSTRACT

A wireless communications device, and a method of operating a wireless communications device, the device operative to receive broadcast system information from a network, the device being arranged to: receive first broadcast system information, said first broadcast system information defining scheduling information for a plurality of items of further broadcast system information; define a subset containing a plurality of items of further broadcast system information; receive an item of further broadcast system information relating to whether transmit diversity is in use; when it is determined that the device has received further broadcast system information relating to whether transmit diversity is in use, wait until one of the following conditions has been met before implementing on the device any changes in transmit diversity as defined by the further broadcast system information relating to whether transmit diversity is in use: i) the device having received all members of the subset of further broadcast system information; or ii) the quality of a signal received by the device being determined to be below a threshold.

28 Claims, 7 Drawing Sheets

(56) References Cited

OTHER PUBLICATIONS

"ETSI TS 125 211 V7.0.0: Universal Mobile Telecommunications System (UMTS); Physical Channels and Mapping of Transport Channels Onto Physical Channels (FDD)"; European Telecommunications Standards Institute, Mar. 2006.

Derryberry et al., "Transmit Diversity in 3G CDMA Systems," IEEE Communications Magazine, vol. 40, No. 4, Apr. 2002.

* cited by examiner

Fig. 7

APPARATUS AND METHOD FOR HANDLING BROADCAST SYSTEM INFORMATION IN TELECOMMUNICATIONS SYSTEM USER EQUIPMENT

TECHNICAL FIELD

The present idea relates to wireless telecommunications services in general and in particular to apparatus and method for handling broadcast system information in wireless telecommunications system user equipment.

BACKGROUND

In many wireless telecommunication systems, system information is broadcast i.e. system information is transmitted from a transmitter (e.g. a base station) forming part of the network for receipt by any appropriate device in range of the transmitter. Typically, this information is information that is common to all appropriate devices within range; thus, it can be sent using a broadcast service. System information is typically information about the system and the serving cell that is sent by the network in a point-to-multipoint manner; that is the information is broadcast for receipt by all appropriate devices within range of the transmitter.

The transmitter may use various techniques for transmitting the system information. For instance, the transmitter may use diversity techniques. Diversity techniques are used to provide a receiver with several replicas of the same information-carrying signal. The information signals are affected when they traverse paths and these signals can be combined at a receiver within a receiving device to provide a diversity gain. Typical diversity techniques use spatial diversity (e.g. where more than one antenna is used to transmit and/or more than one antenna is used to receive a signal) or time diversity (e.g. where the same data is transmitted multiple times or a redundant error code is added or bit-interleaving is used, so that error bursts may be spread in time) or a combination of the diversity techniques (e.g. spatial and time).

One example of a diversity technique is known as Space Time Transmit Diversity (STTD). STTD provides diversity by transmitting the signal from two different antennas (spatial diversity), each having the same information but coded differently (typically coded orthogonally) (time diversity). Using STTD the decoding in the receiver of the user equipment becomes more reliable as STTD provides two kinds of diversity: the physical separation of antennas provides space diversity and the time difference derived from a bit-reversing process provides for time diversity.

The receiving device (also known as User Equipment (UE)) receives both signals but with uncorrelated fading. The UE receiver demodulates each path, summing the two block encoded bits.

One application that may use diversity techniques such as STTD is the Universal Mobile Telecommunications System (UMTS) of Third Generation (3G) telecommunications and it is in this field that the present idea will be described. However the technique is applicable to other telecommunications technologies that are emerging and to other diversity techniques (e.g. spatial, time or a combination of the two). For more information on STTD in the 3G field the reader is referred to the Standard Specification 3GPP 3G TS 25.211 v 5.0.0 (hereinafter referred to as the 25.211 standard), and in particular Section 5.3.1.1.1 (STTD) and Section 5.3.3.3 (PCCPCH with STTD encoding). For a more thorough description of system information as used in UMTS, the RRC specification 3GPP TS 25.331, v 5.0.0 (or updated versions) should be consulted, in particular Table 8.1.1: Specification of system information block characteristics. New system information blocks may be added in the future.

There are thus proposed strategies for an apparatus and a method for handling system information in wireless telecommunications system user equipment. A number of such strategies are detailed below.

Other aspects and features of the proposed strategy will become apparent to those ordinarily skilled in the art upon review of the following description of specific embodiments.

BRIEF DESCRIPTION OF THE DRAWINGS

Embodiments will now be described, by way of example only, with reference to the attached drawings, in which.

The same reference numerals are used in different figures to denote similar elements.

DETAILED DESCRIPTION OF THE DRAWINGS

A method and apparatus for handling broadcast system information in wireless telecommunications system user equipment is described. In the following description, for the purposes of explanation, numerous specific details are set forth in order to provide a thorough understanding of the present invention. It will be apparent, however, to one skilled in the art that the technique may be practised without these specific details. In other instances, well-known structures and devices are shown in block diagram form in order to avoid unnecessarily obscuring the present invention.

The needs identified in the foregoing Background, and other needs and objects that will become apparent from the following description, are achieved by, in one aspect, a method for handling broadcast system information in wireless telecommunications system user equipment. In other aspects, the invention encompasses apparatus and a computer-readable medium configured to carry out the foregoing steps. In particular, the method may be implemented in user equipment telecommunications device, with or without voice capabilities, or other electronic devices such as handheld or portable devices.

A wireless communications device, and a method of operating a wireless communications device, operative to receive broadcast system information from a network is provided. The method comprises, in the device, receiving first broadcast system information (e.g. a master information block) defining scheduling information for a plurality of items of further broadcast system information (e.g. system information blocks) of potential use to the device. A subset containing a plurality of items of further broadcast system information is defined. The device receives an item of further broadcast system information relating to whether transmit diversity is in use. It is determined whether the device has received all members of the subset of further broadcast system information. The device implements any changes in transmit diversity as defined by the further broadcast system information relating to whether transmit diversity is in use once all members of the subset of further broadcast system information are received.

An alternative method comprises the device receiving first broadcast system information (e.g. a master information block) which defines scheduling information for a plurality of items of further broadcast system information (e.g. system information blocks). A subset containing a plurality of items of further broadcast system information is defined. The device receives an item of further broadcast system information relating to whether transmit diversity is in use. When it is determined that the device has received further broadcast system information relating to whether transmit diversity is in use, the device waits until a trigger condition is met before implementing any changes in transmit diversity. Examples of trigger conditions are: i. the device having received all members of the subset of further broadcast system information; or ii. the quality of a signal received by the device being determined to be below a threshold.

According to an embodiment, there is provided a method and apparatus in which a change in transmit diversity is implemented once it is determined that doing so is unlikely to cause a communication disruption. This is achieved by waiting either for a subset of items of further broadcast system information or until a received signal quality drops below a threshold. The threshold may be determined by implementation detail. The threshold may be determined by the device. The threshold may be determined by the network. The subset of items of further broadcast system information contains a plurality of items of further broadcast system information. The subset may contain less than all items of further broadcast system information as defined in the first broadcast system information.

The subset containing a plurality of items of further broadcast system information may be the items of further broadcast system information that are required by the UE in order for the UE to implement transmit diversity without a communication disruption. Such a communication disruption may be, for example, a delay of user data or a call drop. A communication disruption may be anything which affects the user's experience of using the device. Other examples of a communication disruption will be apparent to the skilled reader.

Items of further broadcast system information that will not result in a communication disruption if not read before implementing a change in transmit diversity are not included in the subset of a plurality of items of further broadcast system information. Alternatively, items of further broadcast system information that are unlikely to result in a communication disruption if not read before implementing a change in transmit diversity are not included in the subset containing a plurality of items of further broadcast system information.

Whether a particular item of further broadcast system information is included in the subset or not depends upon implementation detail. Accordingly, the subset includes but is not limited to items of further broadcast system information that would cause communication disruption if not read before implementing a change in transmit diversity.

The subset of items of further broadcast system information may be a set of important items of further broadcast system information. Important items of further broadcast system information are those that are required for implementing a change in transmit diversity without causing a communication disruption. By contrast, a less important item of further broadcast system information, not in the subset, is unlikely to cause a communication disruption if not read before implementing transmit diversity.

Accordingly, a change in transmit diversity is implemented at a convenient time, i.e. when disruption to the user is minimised, or when the likelihood of disruption to the user is minimised.

Irrespective of when the UE reads broadcast system information relating to whether transmit diversity is in use and discovers that transmit diversity is not set up in the UE in accordance with this broadcast system information (e.g. in UMTS that the STTD setting should be other than how the UE is currently set up), the UE continues to read broadcast system information until a further condition is met for instance, until all items of the subset of further broadcast system information as required by the UE have been read or until the quality of a received signal falls below an acceptable level.

The UE then re-configures itself to be set up as defined in the broadcast system information relating to whether transmit diversity is in use. For instance, the UE releases a control channel (in 3G this is PCCPCH (Primary Common Control Physical Channel)) and reconfigures it internally. Delaying the re-configuration of the UE until after the further broadcast system information has been read means that there is not a delay (of for example 120 ms) while the UE re-configures itself in response to the diversity information before subsequent broadcast system information is read by the UE.

Figure 1:
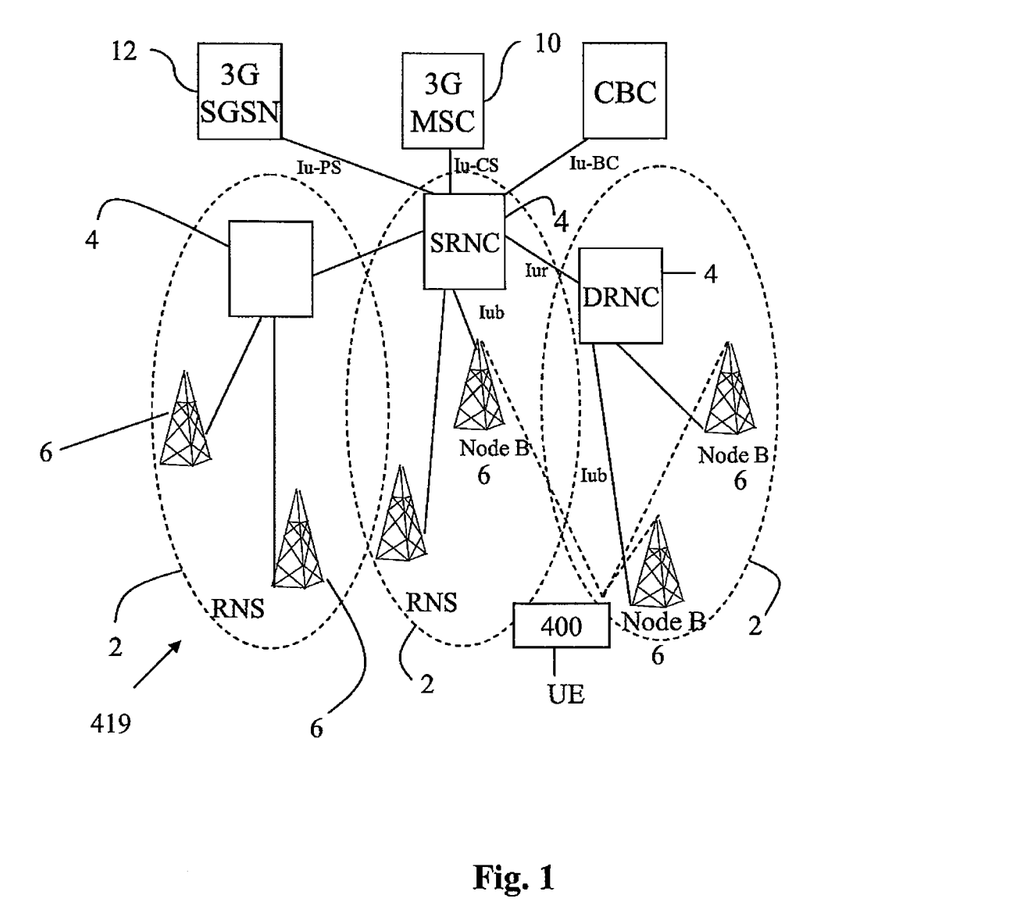
FIG. 1 shows an overview of a network and a user equipment device.

Referring to the drawings, FIG. 1 shows an overview of a network and a UE device. Clearly in practice there may be many UE devices operating with the network but, for the sake of simplicity, FIG. 1 only shows a single UE device 400. For the purposes of illustration, FIG. 1 also shows a network 419 having a few components. It will be clear to a person skilled in the art that in practice a network will include far more components than those shown.

FIG. 1 shows an overview of the radio access network 419 (UTRAN) used in a UMTS system. The network 419 as shown in FIG. 1 comprises three Radio Network Subsystems (RNS) 2. Each RNS has a Radio Network Controller (RNC) 4. Each RNS 2 has one or more Node B 6 which are similar in function to a Base Transmitter Station of a GSM radio access network. User Equipment UE 400 may be mobile within the radio access network. Radio connections (indicated by the straight dotted lines in FIG. 1) are established between the UE and one or more of the Node Bs in the UTRAN.

The radio network controller controls the use and reliability of the radio resources within the RNS 2. Each RNC may also connected to a 3G mobile switching centre 10 (3G MSC) and a 3G serving GPRS support node 12 (3G SGSN).

An RNC 4 controls one or more Node B's. An RNC plus its Node B's together make up an RNS 2. A Node B controls one or more cells. Each cell is uniquely identified by a frequency and a primary scrambling code (primary CPICH in FDD, primary CCPCH in TDD).

Broadcast system information is transmitted by the network. In UMTS and other systems, this broadcast system information typically comprises messages called a master information block (MIB), scheduling blocks (SBs) and a plurality of system information blocks (SIBs). In UMTS the system information elements are broadcast in the system information blocks. A system information block typically groups together system information elements of the same nature. Different system information blocks may have different characteristics, e.g. regarding their repetition rate and the requirements of user equipment to read the System Information.

The MIB represents first broadcast system information, which first broadcast system information includes information relating to further broadcast system information (e.g the SIBs). Examples of information relating to further broadcast system information are: type (e.g. SIB1, SIB2 etc.); scheduling information; expiration time of the further broadcast system information; flags; etc. Scheduling blocks (SBs) may also occur as part of the first broadcast system information.

The further broadcast system information (e.g. the SIBs) typically include the system information to be acted upon by the user equipment e.g. the information elements that determine the operating characteristics of the user equipment. For example, in UMTS, the further broadcast system information (the SIBs) typically includes the following information for each SIB:

Block type e.g. SIB1
System information elements
Optional Expiration time
Optional Value tag The further broadcast system information is transmitted separately from the first broadcast system information, although it may be transmitted on the same channel or a separate channel. For instance, in UMTS, the first broadcast system information (e.g. the MIB) is broadcast on the BCCH (Broadcast Control CHannel) logical channel and the further broadcast system information (the SIBS) are typically transmitted on the same channel.

Broadcast system information is typically sent according to a certain schedule. Some blocks may be sent more often than others. The schedule is not usually fixed, but it may be adjustable by the UTRAN according to the current loading situation. This provides a great deal of flexibility for air interface management. User equipment may find out the schedule of the further broadcast system information (e.g. the SIBs) from the first broadcast system information (e.g. the MIB or SB) so the user equipment can wake up and receive only those blocks it needs and skip reception of the others.

Figure 2:
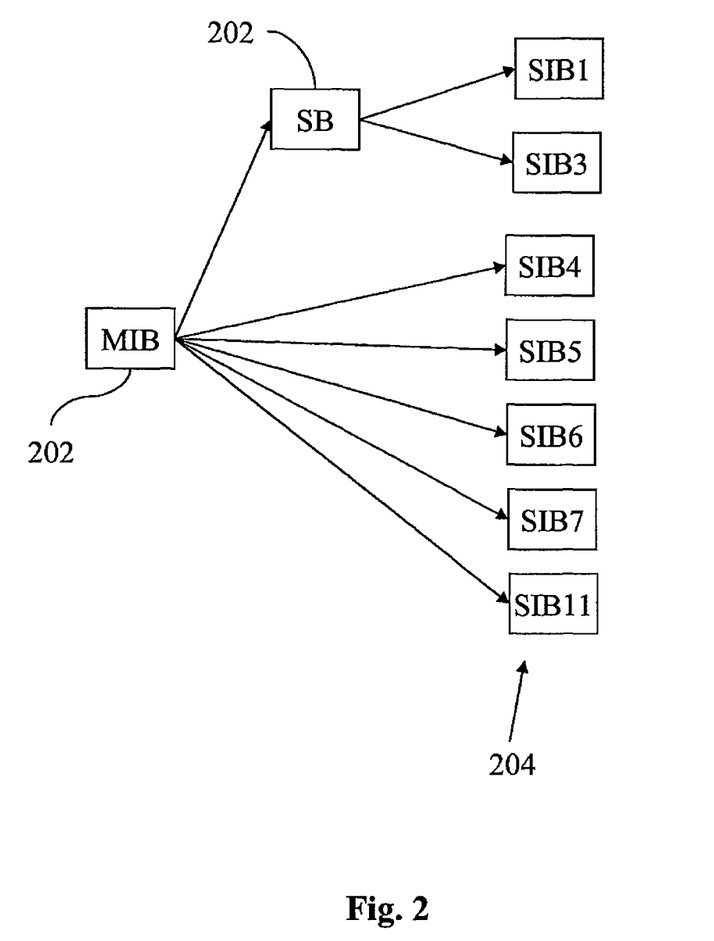
FIG. 2 shows an example of an arrangement of broadcast system information as may be used.

Typically the blocks are arranged as a tree (for example as shown in FIG. 2). (For the sake of simplicity, FIG. 2 only shows a limited number of SBs and SIBs. In practice more or fewer SIBs may be referenced by each MIB or SB.) This tree starts from the first broadcast system information 202 (e.g. a master information block (MIB)), which is received and decoded first. Typically the location of a master information block is easy for the user equipment to determine. Considering for example the FDD mode of UMTS, the MIB has a predefined repetition rate (8), and a position (0) within the repetition cycle. This means that once user equipment knows the current frame number (this information typically being sent in every block), it can compute the cell system frame number (SFN) mod 8, and find out the position of this block within the 8-block rotation. In the TDD mode, the MIB repetition cycle can be 8, 16, or 32 frames. In TDD, typically the value that the UTRAN is using is not signaled; the UE determines it by trial and error.

The MIB indicates the identity and the schedule of further broadcast system information 204 (e.g. a number of other SIBs). This further broadcast system information 204 (e.g. the SIBs) contain the actual system information for which the UE is monitoring. The first broadcast system information 202 may also include one or more SBs for which the MIB may also contain reference and scheduling information, and the SBs may give references and scheduling information for the further broadcast system information 204 (e.g. other SIBs). Thus in UMTS the first broadcast system information 202 (e.g. the scheduling information for a SIB) may be included only in the MIB or one of the SBs. The UE maintains this tree in its memory so that it can decode only those blocks it needs and skip the rest. This arrangement saves power and also provides the UTRAN with the possibility to add new types of SIBs to the protocol if such are needed later, as is likely.

If user equipment finds schedules of blocks it does not recognize, it may simply ignore them. Other user equipment with updated protocol software can, however, use these. If user equipment notices that the schedule in its memory does not match the schedule used by the UTRAN, it may delete the stored schedule and start building the scheduling tree again beginning from the MIB.

The network may indicate that some information in a SIB has changed by setting an update flag (value tag) in a higher block; that is, in the same block that contains the schedule for this block. Once this tag changes, the user equipment knows that it should recover the corresponding system information again.

In 3G systems, SIBs are broadcast on the Primary Common Control Physical Channel (PCCPCH). PCCPCH is the physical channel on which system information is broadcast. In 3G systems, the PCCPCH carries the BCH transport channel, which in turn carries the BCCH logical channel. System information relating to whether transmit diversity is in use (e.g. STTD) is broadcast in SIB 5 or 6 (according to the 25.331 standard if SIB6 is not transmitted then the UE uses information in SIB5).

The UE device is operative to receive broadcast system information from a network. The UE receives first broadcast system information (202) relating to broadcast system information, the first broadcast system information (202) defining the scheduling information for a plurality of items of further broadcast system information (204) of use to the UE (e.g. SIBs). In response to the scheduling information contained in the first broadcast system information, the UE then monitors for further broadcast system information (204). Subsequent to receiving the further broadcast system information of potential use to the device, the scheduling of which is defined in the first broadcast system information, the device determines whether the device has received further broadcast system information relating to whether transmit diversity is in use. Thus, irrespective of when the device receives the further broadcast system information relating to whether transmit diversity is in use, the UE delays implementing a change in transmit diversity decoding in the UE until after receipt of the items of further broadcast system information of use to the UE or of potential use to the UE, the scheduling of which is defined in the first broadcast system information. Subsequent to the UE having received the items of further broadcast system information (204) of use to the UE or of potential use to the UE and as scheduled in the first broadcast system information (202), the UE re-configures itself to implement changes in transmit diversity decoding as defined by the broadcast system information relating to whether transmit diversity is in use.

Figure 3:
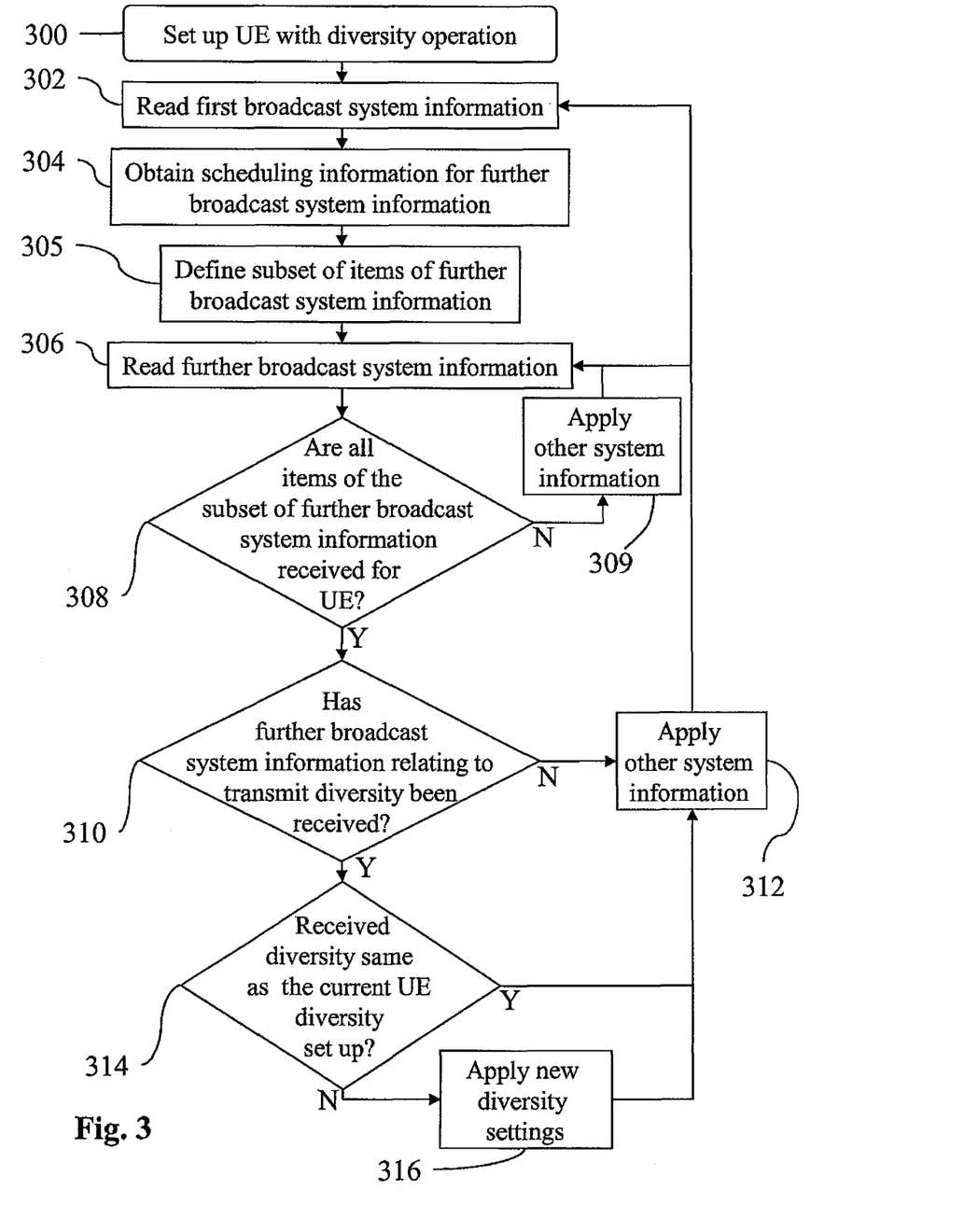
FIG. 3 is a flow chart illustrating an embodiment of the technique.

FIG. 3 is a flow chart of an embodiment of this technique. Initially the UE may not know what transmit diversity technique, if any, is being used in transmissions from the network. Therefore, when the UE initiates operation, it first sets up with a diversity setting (step 300). For example, say the default initial set up is that transmit diversity is set to ON e.g. the UE implements decoding operations relating to transmit diversity and the default is to implement STTD.

Next, the UE monitors broadcast system information transmissions for first broadcast system information and reads this (step 302). For instance, the UE reads the MIB (and SBs if transmitted). The UE then obtains from the first broadcast system information the scheduling information for the further broadcast system information (step 304) (e.g. for the SIBs).

The UE then defines a subset of items of further broadcast system information (step 305). The subset of items of further broadcast system information consists of the items of further broadcast system information that would result in a communication disruption if not read before implementing a change in transmit diversity. Such a communication disruption may be a communication delay. The subset is determined according to the specific implementation present in the UE. The subset of items of further broadcast system information comprises a plurality of items of further broadcast information. The subset of items of further broadcast system information may consist of fewer items than the total set of further broadcast information.

The UE then monitors broadcast system information for the further broadcast system information and reads appropriate further broadcast system information (the scheduling of which is set out in the first broadcast system information) as the further broadcast system information is received (step 306). The UE continues to monitor and read all appropriate further broadcast system information until all items of the subset of further broadcast system information as required by the UE and as scheduled in the first broadcast system information are received (step 308). Thus the UE now has all the further broadcast system information (and hence system information elements) needed by the UE to implement a change of transmit diversity settings without causing a communication disruption. During receipt of the further broadcast system information, the UE may implement any further broadcast system information as appropriate (step 309).

Once the UE has received all items of the subset of further broadcast system information (step 308), the UE then determines whether any of the further broadcast system information received relates to transmit diversity (step 310). If it does not, then the operation of the UE as far as any changing of transmit diversity settings is concerned ends. However it will be appreciated by the skilled person that in practice the UE applies the other system information elements it has received as appropriate (step 312). However this operation will not be described further as it is not of concern to the transmit diversity settings of the UE and so the flow chart of FIG. 3 does not elaborate on this aspect of step 312.

When the UE determined that further broadcast system information relating to transmit diversity has been received (step 310) the UE determines whether the received information relating to transmit diversity is the same as the current diversity set up of the UE (step 314). If the received information relating to transmit diversity is the same as the current diversity set up of the UE (step 314), then the UE returns to monitor the broadcast system information for first broadcast system information (step 302) or for further broadcast system information (step 306) after applying any other system information elements (step 312).

If the received information relating to transmit diversity is not the same as the current diversity set up of the UE (step 314), then the UE applies the new diversity setting (step 316). After applying the new diversity setting, the UE returns to monitor the broadcast system information for first broadcast system information (step 302) or for further broadcast system information (step 306).

For instance, say the UE initiated at step 300 with transmit diversity set to ON (e.g. with STTD enabled). At step 314, the received system information element relating to transmit diversity is compared with this setting. Say the received system information element relating to transmit diversity indicates that a transmit diversity technique should not be used (e.g. the information element relating to transmit diversity is set to FALSE), then step 314 is answered in the negative and the UE then at step 316 applies the new diversity setting i.e. in this example the UE disables STTD. The UE, once reconfigured in this manner, then does not apply STTD to signals subsequently received by the UE.

Application of the new diversity settings at step 316 may for example comprise releasing a channel such as the PCCPCH channel and setting up a new PCCPCH channel with the new settings. Alternatively, the new settings may be applied without releasing a channel such as the PCCPCH channel. A channel may be reconfigured with the new settings without releasing the channel.

Transmission Time Interval (TTI) is defined as the inter-arrival time of Transport Block Sets (TBSs), and is equal to the periodicity at which a Transport Block Set is transferred by the physical layer on the radio interface. It is a multiple of the minimum interleaving period (e.g. 10 ms, the length of one RF (Radio Frame)). The MAC (Medium Access Control) delivers one Transport Block Set to the physical layer every TTI. In practice in UMTS, SIBs are broadcast in 20 ms TTIs on PCCPCH. Every 80 ms a MIB is scheduled and that (together with any Scheduling blocks) indicates which TTIs (indexed by an SFN 0 . . . 4095) contain which SIBs. In a given scenario, the UE needs certain SIBs. For instance, this may be as the result of receiving a message such as RRCConnectionSetup or RadioBearerRelease that changes the UE state from Idle to Cell_FACH or from Cell_DCH to Cell_FACH. The SIBs the UE is waiting for just arrive in broadcast TTIs. So, for instance, if the UE is waiting for SIBs 1, 3, and 5, it may be waiting for and hence monitor TTIs 500, 510, 512 and 550.

Figure 4:
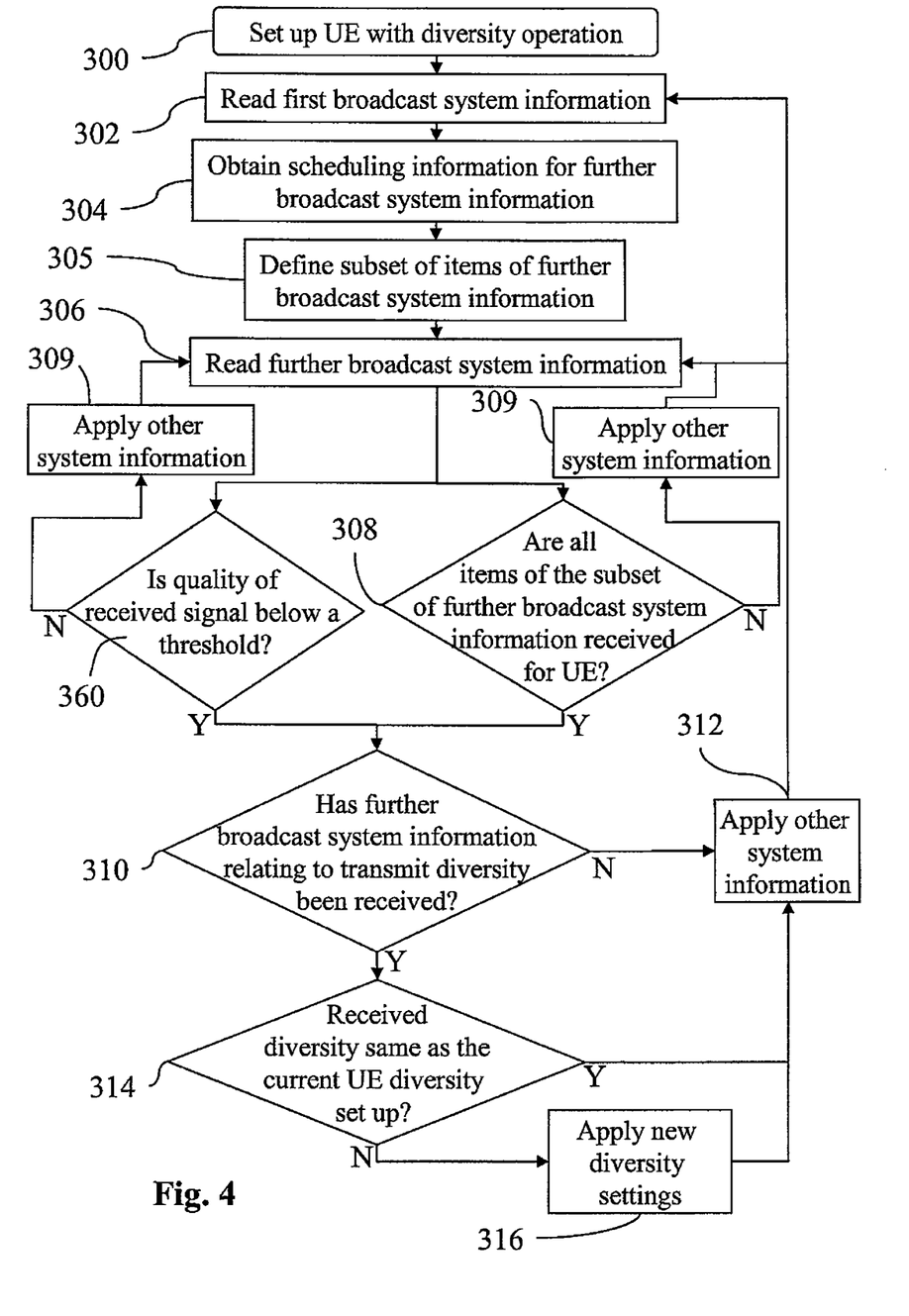
FIG. 4 is a flow chart illustrating a second embodiment of the technique.

FIG. 4 shows a further embodiment of the invention. The same reference numerals have been used for steps that are the same as those previously described. In this embodiment, the application of a new transmit diversity setting is triggered either by all items of the subset of further broadcast system information (e.g. SIBs) being received (step 308) or by the quality of the received signal falling below a threshold. The process includes a second branch comprising step 360, a determination of whether the quality of the received signal is below a threshold. If this is determined to be so, the device checks whether any of the further broadcast system information received so far relates to transmit diversity (step 310) and, if so, determines whether the received transmit diversity information is the same as or different from the current transmit diversity setting of the device (step 314). If the received transmit diversity information is different from the current transmit diversity setting of the device, the device implements the new diversity setting (step 316).

Thus, in the second embodiment as illustrated in FIG. 4, if the signal is strong, then a potential loss of effective signal strength by using an incorrect status for the diversity is less likely to matter. Avoiding reconfiguration of the transmit diversity settings until all items of the subset of further broadcast system information needed by the device has been received therefore provides advantages over reconfiguring the device at the time the further broadcast system information relating to transmit diversity has been received.

However, if the signal strength is weak, delaying the reconfiguration may result in more lost blocks than applying it straight away. Avoiding the delay involved with reconfiguring the transmit diversity setting of the device may actually make reading the required SIBs take longer and so, according to the second embodiment, the reconfiguration of the transmit diversity setting of the device may also be triggered when the quality of the received signal falls below a threshold. If the device determines that it is using the wrong transmit diversity setting, the device determines whether it should reconfigure now or delay that reconfiguration. If the quality of the received signal (e.g. the PCCPCH channel) is deemed to be poor (step 360), then the device applies the reconfiguration now. If the quality of the signal is deemed to be above a threshold, then the device delays applying the reconfiguration of the transmit diversity setting until all items of the subset of further broadcast system information is received or the quality of the received signal falls below a threshold.

Poor quality can be defined in a number of ways, and these may be combined together to provide additional quality measures. The quality of the received signal strength may be determined in any of a number of ways. For example, the quality of the signal may be determined according to at least one of the following:

a) determining the success of data received, for example;
   i) if no bad blocks have been received (for example on the PCCPCH), then the quality is considered to be high i.e. to meet or be above the threshold;
   ii) if a bad block "leaky bucket" is empty, quality is considered low i.e. to be below the threshold. Here a device could start with a "bucket" with a nominal level of 50 say. For every good block received by the device (for example on PCCPCH) a number, for example "one", is added to the level, provided the bucket is not full already. The full level may be 100 say. Every time a block is read with a bad CRC, the level of the bucket is reduced, e.g. by 10. If the bucket is empty, the quality is deemed to be below the required threshold.
 b) determining a power level, for example;
   i) if CPICH_RSCP is higher than a threshold, the quality is considered to be good i.e. to meet or be above the threshold;
 c) determining a signal to noise ratio is high, for example;
   i) if Ec/No for the cell is high, quality (for example of the PCCPCH) is considered to be high i.e. to meet or be above the threshold;
 d) carrying out a cyclic redundancy check, for example;
   i) if more than N blocks have been read (for example from PCCPCH) but have a bad CRC, then quality is considered to be low i.e. to be below the threshold.

These examples of determining quality are not intended to be limiting and other ways of determining quality will be clear to persons skilled in the art.

Figure 5:
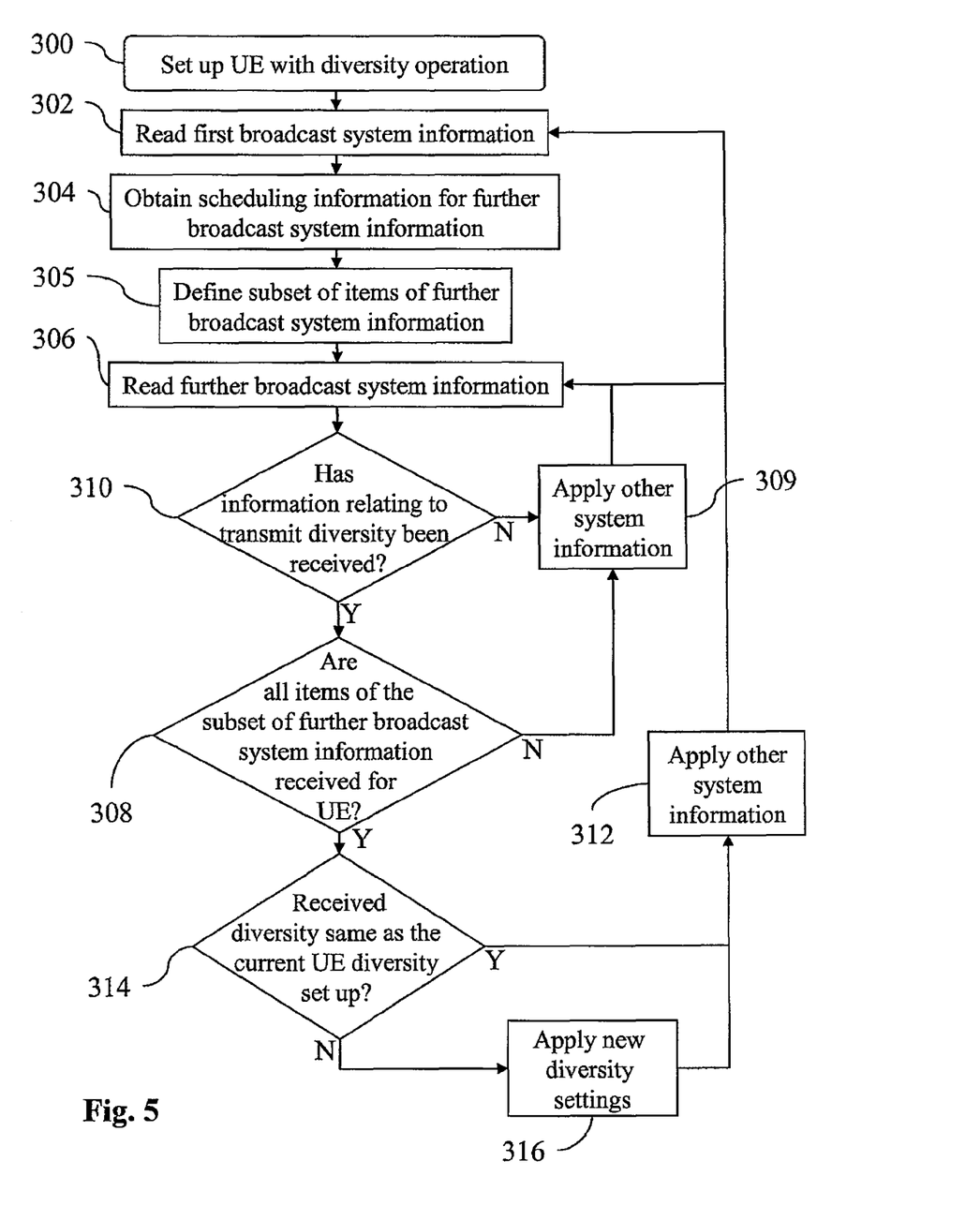
FIG. 5 is a flow chart illustrating a third embodiment of the technique.
Figure 6:
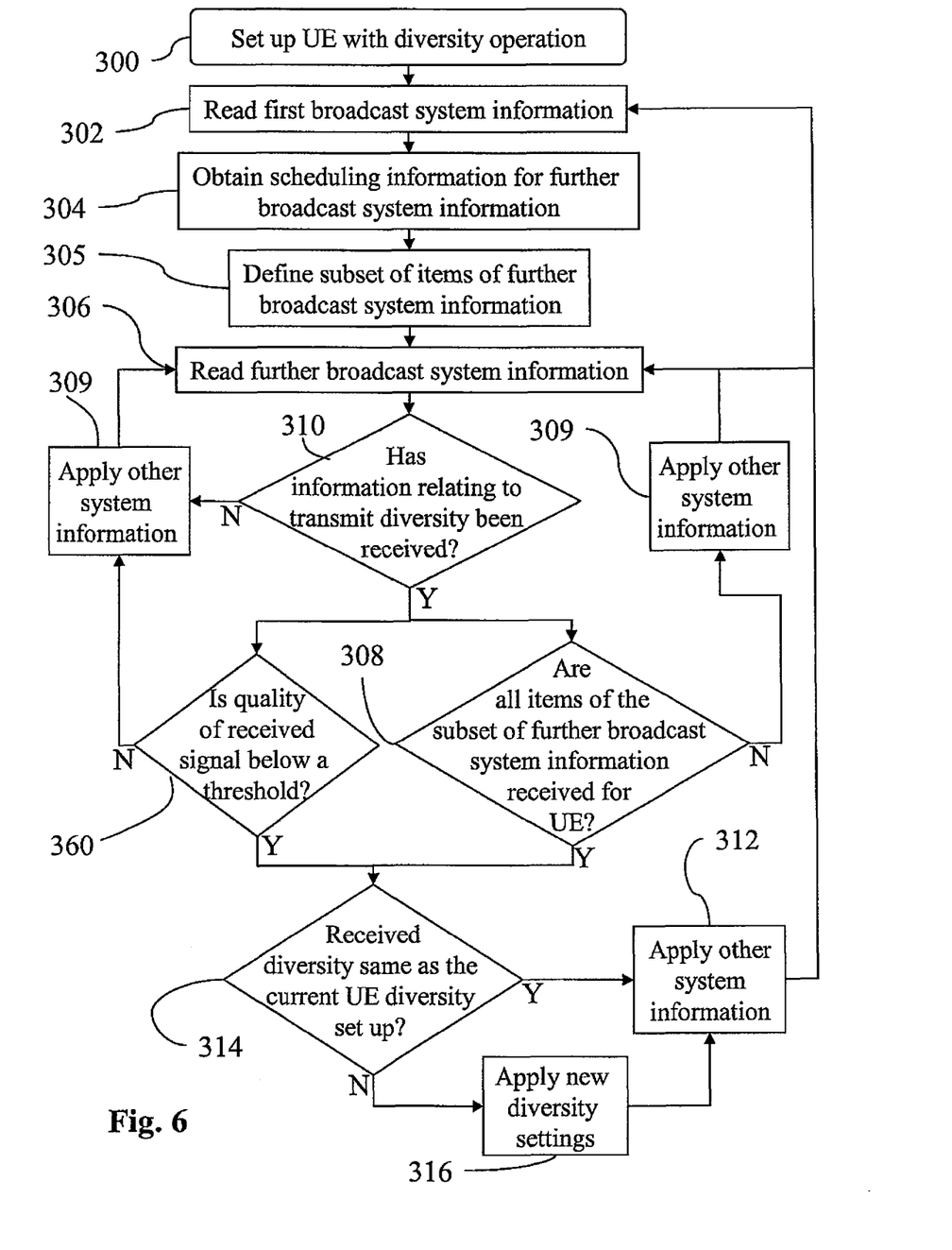
FIG. 6 is a flow chart illustrating a fourth embodiment of the technique.

FIGS. 5 and 6 are similar to FIGS. 3 and 4 respectively but show how the order of steps 310 and 308, for example, may be interchangeable. Embodiments of the invention have been describe with reference to implementing a change in transmit diversity. This may be the transmit diversity of a particular channel, such as a physical channel. In this case, the invention is applied for the transmit diversity settings of this channel only. The invention may be applied to the transmit diversity of another channel, or possibly more than one channel.

Figure 7:
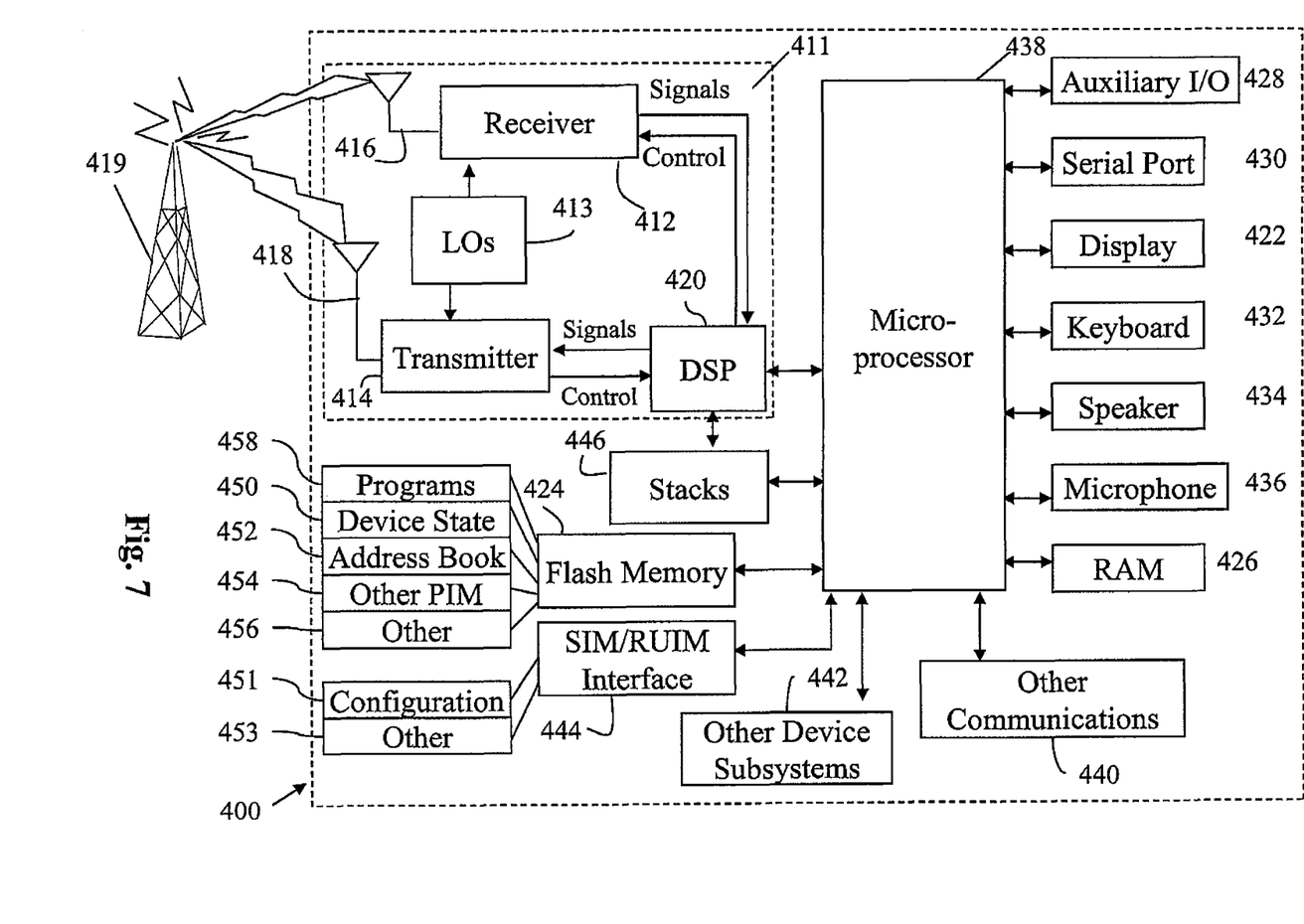
FIG. 7 is a block diagram illustrating a user equipment device, which can act as a UE and co-operate with the apparatus and methods of FIGS. 1 to 6.

Turning now to FIG. 7, FIG. 7 is a block diagram illustrating a mobile device, which can act as a UE and co-operate with the apparatus and methods of FIGS. 1 to 6, and which is an exemplary wireless communication device. Mobile station 400 is preferably a two-way wireless communication device having at least voice and data communication capabilities. Mobile station 400 preferably has the capability to communicate with other computer systems on the Internet. Depending on the exact functionality provided, the wireless device may be referred to as a data messaging device, a two-way pager, a wireless e-mail device, a cellular telephone with data messaging capabilities, a wireless Internet appliance, or a data communication device, as examples.

Where mobile station 400 is enabled for two-way communication, it will incorporate a communication subsystem 411, including both a receiver 412 and a transmitter 414, as well as associated components such as one or more, preferably embedded or internal, antenna elements 416 and 418, local oscillators (LOs) 413, and a processing module such as a digital signal processor (DSP) 420. As will be apparent to those skilled in the field of communications, the particular design of the communication subsystem 411 will be dependent upon the communication network in which the device is intended to operate. For example, mobile station 400 may include a communication subsystem 411 designed to operate within the Mobitex™ mobile communication system, the DataTAC™ mobile communication system, GPRS network, UMTS network, or EDGE network.

Network access requirements will also vary depending upon the type of network 402. For example, in the Mobitex and DataTAC networks, mobile station 400 is registered on the network using a unique identification number associated with each mobile station. In UMTS and GPRS networks, however, network access is associated with a subscriber or user of mobile station 400. A GPRS mobile station therefore requires a subscriber identity module (SIM) card in order to operate on a GPRS network. Without a valid SIM card, a GPRS mobile station will not be fully functional. Local or non-network communication functions, as well as legally required functions (if any) such as "911" emergency calling, may be available, but mobile station 400 will be unable to carry out any other functions involving communications over the network 402. The SIM interface 444 is normally similar to a card-slot into which a SIM card can be inserted and ejected like a diskette or PCMCIA card. The SIM card can have approximately 64K of memory and hold many key configuration 451, and other information 453 such as identification, and subscriber related information.

When required network registration or activation procedures have been completed, mobile station 400 may send and receive communication signals over the network 402. Signals received by antenna 416 through communication network 402 are input to receiver 412, which may perform such common receiver functions as signal amplification, frequency down conversion, filtering, channel selection and the like, and in the example system shown in FIG. 7, analog to digital (A/D) conversion. A/D conversion of a received signal allows more complex communication functions such as demodulation and decoding to be performed in the DSP 420. In a similar manner, signals to be transmitted are processed, including modulation and encoding for example, by DSP 420 and input to transmitter 414 for digital to analog conversion, frequency up conversion, filtering, amplification and transmission over the communication network 402 via antenna 418. DSP 420 not only processes communication signals, but also provides for receiver and transmitter control. For example, the gains applied to communication signals in receiver 412 and transmitter 414 may be adaptively controlled through automatic gain control algorithms implemented in DSP 420.

Mobile station 400 preferably includes a microprocessor 438 which controls the overall operation of the device. Communication functions, including at least data and voice communications, are performed through communication subsystem 411. Microprocessor 438 also interacts with further device subsystems such as the display 422, flash memory 424, random access memory (RAM) 426, auxiliary input/output (I/O) subsystems 428, serial port 430, keyboard 432, speaker 434, microphone 436, a short-range communications subsystem 440 and any other device subsystems generally designated as 442.

Some of the subsystems shown in FIG. 7 perform communication-related functions, whereas other subsystems may provide "resident" or on-device functions. Notably, some subsystems, such as keyboard 432 and display 422, for example, may be used for both communication-related functions, such as entering a text message for transmission over a communication network, and device-resident functions such as a calculator or task list.

Operating system software used by the microprocessor 438 is preferably stored in a persistent store such as flash memory 424, which may instead be a read-only memory (ROM) or similar storage element (not shown). Those skilled in the art will appreciate that the operating system, specific device applications, or parts thereof, may be temporarily loaded into a volatile memory such as RAM 426. Received communication signals may also be stored in RAM 426.

As shown, flash memory 424 can be segregated into different areas for both computer programs 458 and program data storage 450, 452, 454 and 456. These different storage types indicate that each program can allocate a portion of flash memory 424 for their own data storage requirements. Microprocessor 438, in addition to its operating system functions, preferably enables execution of software applications on the mobile station. A predetermined set of applications that control basic operations, including at least data and voice communication applications for example, will normally be installed on mobile station 400 during manufacturing. A preferred software application may be a personal information manager (PIM) application having the ability to organize and manage data items relating to the user of the mobile station such as, but not limited to, e-mail, calendar events, voice mails, appointments, and task items. Naturally, one or more memory stores would be available on the mobile station to facilitate storage of PIM data items. Such PIM application would preferably have the ability to send and receive data items, via the wireless network 402. In a preferred embodiment, the PIM data items are seamlessly integrated, synchronized and updated, via the wireless network 402, with the mobile station user's corresponding data items stored or associated with a host computer system. Further applications may also be loaded onto the mobile station 400 through the network 402, an auxiliary I/O subsystem 428, serial port 430, short-range communications subsystem 440 or any other suitable subsystem 442, and installed by a user in the RAM 426 or preferably a non-volatile store (not shown) for execution by the microprocessor 438. Such flexibility in application installation increases the functionality of the device and may provide enhanced on-device functions, communication-related functions, or both. For example, secure communication applications may enable electronic commerce functions and other such financial transactions to be performed using the mobile station 400.

In a data communication mode, a received signal such as a text message or web page download will be processed by the communication subsystem 411 and input to the microprocessor 438, which preferably further processes the received signal for output to the display 422, or alternatively to an auxiliary I/O device 428. A user of mobile station 400 may also compose data items such as email messages for example, using the keyboard 432, which is preferably a complete alphanumeric keyboard or telephone-type keypad, in conjunction with the display 422 and possibly an auxiliary I/O device 428. Such composed items may then be transmitted over a communication network through the communication subsystem 411.

For voice communications, overall operation of mobile station 400 is similar, except that received signals would preferably be output to a speaker 434 and signals for transmission would be generated by a microphone 436. Alternative voice or audio I/O subsystems, such as a voice message recording subsystem, may also be implemented on mobile station 400. Although voice or audio signal output is preferably accomplished primarily through the speaker 434, display 422 may also be used to provide an indication of the identity of a calling party, the duration of a voice call, or other voice call related information for example.

Serial port 430 in FIG. 7, would normally be implemented in a personal digital assistant (PDA)-type mobile station for which synchronization with a user's desktop computer (not shown) may be desirable, but is an optional device component. Such a port 430 would enable a user to set preferences through an external device or software application and would extend the capabilities of mobile station 400 by providing for information or software downloads to mobile station 400 other than through a wireless communication network. The alternate download path may for example be used to load an encryption key onto the device through a direct and thus reliable and trusted connection to thereby enable secure device communication.

Other communications subsystems 440, such as a short-range communications subsystem, is a further optional component which may provide for communication between mobile station 400 and different systems or devices, which need not necessarily be similar devices. For example, the subsystem 440 may include an infrared device and associated circuits and components or a Bluetooth™ communication module to provide for communication with similarly enabled systems and devices.

When mobile device 400 is used as a UE, protocol stacks 446 include apparatus for implementing a method for handling broadcast system information in telecommunications system user equipment.

EXTENSIONS AND ALTERNATIVES

Thus there has been described a device and a method of operating a wireless communications device, the wireless communications device being operative to receive broadcast system information from a network. The method generally comprises, in the device, receiving first broadcast system information, said first broadcast system information defining scheduling information for a plurality of items of further broadcast system information of potential use to the device; defining a subset containing a plurality of items of further broadcast system information; receiving an item of further broadcast system information relating to whether transmit diversity is in use, determining whether the device has received all members of the subset of further broadcast system information, implementing on the device any changes in transmit diversity as defined by the further broadcast system information relating to whether transmit diversity is in use once all members of the subset of further broadcast system information are received.

In embodiments, a device may not support all of the items of further broadcast system information. Accordingly, not all of the items of further broadcast system information are of use to the device. Alternatively, the device supports all of the plurality of items of further broadcast system information and in this case all the items of further broadcast system information may be of use to the device.

In the foregoing specification, the invention has been described with reference to specific embodiments thereof. It will, however, be evident that various modifications and changes may be made thereto without departing from the scope of the technique. The specification and drawings are, accordingly, to be regarded in an illustrative rather than a restrictive sense.

It is to be noted that the methods as described have shown steps being carried out in a particular order. However, it would be clear to a person skilled in the art that in many cases the order of the evaluation is immaterial with respect to the operation of the method. The ordering of the steps as described herein is not intended to be limiting. For instance, as will be clear to a person skilled in the art, step 312 may occur before step 310.

It is also to be noted that where a method has been described it is also intended that protection is also sought for a device arranged to carry out the method and where features have been claimed independently of each other these may be used together with other claimed features.

What is claimed is:

1. A method in a wireless communications device the method comprising:
   receiving, in the wireless communication device, first broadcast system information defining scheduling information for further broadcast system information;
   defining, in the wireless communication device, a subset, the subset being less than a total broadcasted set of the further broadcast system information, the subset defined to comprise at least one system information block required to be read by the device before implementing changes in transmit diversity without the likelihood of communication disruption,
   receiving a system information block relating to whether transmit diversity is in use, the further broadcast information comprising the system information block relating to whether transmit diversity is in use;
   determining whether the system information block relating to whether transmit diversity is in use comprises a system information element defining a change in transmit diversity; and in response to a determination that a change in transmit diversity is defined, and in response:
   determining a quality of a signal received by the device being determined to be above a threshold; and in response:
   refraining from reconfiguration of the change in transmit diversity until the device has received all members of the subset of system information blocks; and in response:
   implementing on the device any changes in transmit diversity as defined by the system information blocks relating to transmit diversity.

2. A method according to claim 1, the subset of the further broadcast system information further comprises a plurality of system information blocks, wherein the system information blocks include system information elements.

3. A method according to claim 1, wherein implementation of any changes in transmit diversity comprises releasing a communication channel and re-establishing the communication channel in accordance with the system information block relating to whether transmit diversity is muse.

4. A method according to claim 3, wherein the released communication channel is a Physical Channel.

5. A method according to claim 3, wherein the released communication channel is a Primary Common Control Physical Channel (PCCPCH).

6. A method according to claim 1, wherein the system information block relating to whether transmit diversity is in use defines whether Space Time Transmit Diversity is in use.

7. A non-transitory computer program product comprising instructions that when executed in a wireless communications device perform the following steps:
   receiving, in the wireless communication device, first broadcast system information defining scheduling information for a plurality of system information blocks of potential use to the device;
   defining a subset of the further broadcast system information, the subset being less than a total broadcasted set of the further broadcast system information and defined to comprise at least one system information block required to be read by the device before implementing changes in transmit diversity in order to implement the changes without the likelihood of communication disruption;
   receiving a system information block comprising a system information element relating to whether transmit diversity is in use, the further broadcast information comprising the system information block relating to whether transmit diversity is in use;
   determining whether the system information block relating to whether transmit diversity is in use defines a change in transmit diversity; and in response to a determination that a change in transmit diversity is defined:
   determining a quality of a signal received by the device being determined to be above a threshold; and in response:
   refraining from reconfiguration of the change in transmit diversity until the device has received all members of the subset of system information blocks;
   and in response:
   implementing on the device any changes in transmit diversity as defined by the system information blocks relating to transmit diversity.

8. A wireless communications device, the device being arranged to:
   receive first broadcast system information defining scheduling information for further broadcast system information;
   define a subset of the further broadcast system information, the subset being less than a total broadcasted set of the further broadcast system information, the subset defined to comprise at least one system information block required to be read by the device before implementing changes in transmit diversity without the likelihood of a communication disruption;
   receive a system information block comprising a system information element relating to whether transmit diversity is in use, the further broadcast information comprising the system information block relating to whether transmit diversity is in use;
   determine whether the system information block relating to whether transmit diversity is in use defines a change in transmit diversity; and in response to a determination that a change in transmit diversity is defined:
   determine a quality of a signal received by the device being determined to be above a threshold; and in response:
   refrain from reconfiguration of the change in transmit diversity until the device has received all members of the subset of system information blocks; and in response:
   implement any changes in transmit diversity as defined by the system information blocks relating to transmit diversity.

9. A device according to claim 8, the subset of the further broadcast system information further comprises a plurality of system information blocks, wherein the system information blocks include system information elements.

10. A device according to claim 8, wherein implementation of any changes in the transmit diversity comprises releasing a communication channel and re-establishing the communication channel in accordance with the system information block relating to whether transmit diversity is in use.

11. A device according to claim 10, wherein the released communication channel is a Physical Channel.

12. A device according to claim 10, wherein the released communication channel is a Primary Common Control Physical Channel (PCCPCH).

13. A device according to claim 8, wherein the system information block relating to whether transmit diversity is in use defines whether Space Time Transmit Diversity is in use.

14. A method in a wireless communications device, the method comprising:
   receiving, in the wireless communication device, first broadcast system information defining scheduling information for further broadcast system information blocks;
   defining, in the wireless communication device, a subset of the further broadcast system information, the subset being less than a total broadcasted set of the further broadcast system information, the subset defined to comprise at least one system information block required to be read by the device before implementing changes in transmit diversity without the likelihood of a communication disruption;
   receiving a system information block comprising a system information element relating to whether transmit diversity is in use, the further broadcast information comprising the system information block relating to whether transmit diversity is in use;
   when it is determined that the device has received a system information block relating to whether transmit diversity is in use, waiting until the quality of a signal received by the device being determined to be below a threshold before implementing on the device any changes in transmit diversity as defined by the system information block relating to whether transmit diversity is in use.

15. A method according to claim 14, wherein the quality of a signal received by the device is determined according to at least one of the following methods:
   a) determining the success rate of data received;
   b) determining a power level;
   c) determining a signal to noise ratio;
   d) carrying out a cyclic redundancy check.

16. A method according to claim 14, the subset of the further broadcast system information further comprises a plurality of system information blocks, wherein the system information blocks include system information elements.

17. A method according to claim 14, wherein implementation of any changes in transmit diversity comprises releasing a communication channel and re-establishing the communication channel in accordance with the system information block relating to whether transmit diversity is in use.

18. A method according to claim 17, wherein the released communication channel is a Physical Channel.

19. A method according to claim 17, wherein the released communication channel is a Primary Common Control Physical Channel (PCCPCH).

20. A method according to claim 14, wherein the system information block relating to whether transmit diversity is in use defines whether Space Time Transmit Diversity is in use.

21. A non-transitory computer program product comprising instructions that when executed in a wireless communications device perform the following steps:
   receiving first broadcast system information defining scheduling information for further broadcast of system information blocks;
   defining a subset of the further broadcast system information, the subset being less than a total broadcasted set of the further broadcast system information, the subset defined to comprise at least one system information block required to be read by the device before implementing changes in transmit diversity in order to implement the changes without the likelihood of a communication disruption;
   receiving a system information block comprising a system information element relating to whether transmit diversity is in use, the further broadcast information comprising the system information block relating to whether transmit diversity is in use;
   when it is determined that the device has received a system information block relating to whether transmit diversity is in use, waiting until the quality of a signal received by the device being determined to be below a threshold before implementing on the device any changes in transmit diversity as defined by the system information block relating to whether transmit diversity is in use.

22. A wireless communications device, the device being arranged to:
   receive first broadcast system information defining scheduling information for a plurality of system information blocks;
   define a subset of the further broadcast system information, the subset being less than a total broadcasted set of the further broadcast system information, the subset defined to comprise at least one system information block required to be read by the device before implementing changes in transmit diversity in order to implement the changes without the likelihood of a communication disruption;
   receive a system information block comprising a system information element relating to whether transmit diversity is in use, the further broadcast information comprising the system information block relating to whether transmit diversity is in use;
   when it is determined that the device has received a system information block relating to whether transmit diversity is in use, wait until the quality of a signal received by the device being determined to be below a threshold before implementing on the device any changes in transmit diversity as defined by the system information block relating to whether transmit diversity is in use.

23. A device according to claim 22, wherein the quality of a signal received by the device is determined according to at least one of the following methods:
   a) determining the success rate of data received;
   b) determining a power level;
   c) determining a signal to noise ratio;
   d) carrying out a cyclic redundancy check.

24. A device according to claim 22, the subset of the further broadcast system information further comprises a plurality of system information blocks, wherein the system information blocks include system information elements.

25. A device according to claim 22, wherein implementation of any changes in transmit diversity comprises releasing a communication channel and re-establishing the communication channel in accordance with the system information block relating to whether transmit diversity is in use.

26. A device according to claim 25, wherein the released communication channel is a Physical Channel.

27. A device according to claim 25, wherein the released communication channel is a Primary Common Control Physical Channel (PCCPCH).

28. A device according to claim 22, wherein the system information block relating to whether transmit diversity is in use defines whether Space Time Transmit Diversity is in use.

\* \* \* \* \*